United States Patent
McGrath et al.

[19]

[11] Patent Number: 5,923,794
[45] Date of Patent: *Jul. 13, 1999

[54] CURRENT-MEDIATED ACTIVE-PIXEL IMAGE SENSING DEVICE WITH CURRENT RESET

[75] Inventors: R. Daniel McGrath, Andover; Vincent S. Clark, Arlington; Lisa G. Dron, Lexington; Adolphus Kearney, Billerica; James R. Toker, Cambridge, all of Mass.

[73] Assignee: Polaroid Corporation, Cambridge, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/595,981

[22] Filed: Feb. 6, 1996

[51] Int. Cl.$^6$ ........................................................ G06K 7/00
[52] U.S. Cl. ........................... 382/312; 257/291; 257/292; 250/370.01
[58] Field of Search ........................ 382/312; 340/825.91; 257/65, 66, 291, 292; 327/514; 250/370.01

[56] References Cited

U.S. PATENT DOCUMENTS

| | | | |
|---|---|---|---|
| 4,407,010 | 9/1983 | Baji et al. ................................. | 358/213 |
| 4,445,117 | 4/1984 | Gaalema et al. .................... | 340/825.91 |
| 4,463,383 | 7/1984 | Soneda et al. ........................... | 358/212 |
| 5,477,489 | 12/1995 | Weidmann .......................... | 365/189.04 |

FOREIGN PATENT DOCUMENTS

| | | | |
|---|---|---|---|
| 01289381 | 11/1989 | Japan .............................. | H04N 5/335 |
| 05207374 | 8/1993 | Japan .............................. | H04N 5/335 |
| WO 95/32580 | 11/1995 | WIPO .............................. | H04N 3/15 |

OTHER PUBLICATIONS

"Progress in CMOS Active Pixel Inage Sensors," Sunetra K. Mendis et al., *Proceedings of the SPIE*, vol. 2172, Charge--Coupled Devices and Solid State Optical Sensors IV (1994).

*Primary Examiner*—David K. Moore
*Assistant Examiner*—Anh Hong-Do
*Attorney, Agent, or Firm*—Joseph Stecewycz

[57] ABSTRACT

An image sensing device comprising active pixels is disclosed, each pixel having a charge accumulation region for collecting charges generated by a photosensitive element such as a photodiode. Fixed pattern noise is minimized by utilizing a reference current to reset the pixels and to generate an output current signal.

13 Claims, 5 Drawing Sheets

CURRENT-MEDIATED ACTIVE-PIXEL IMAGE SENSING DEVICE WITH CURRENT RESET

This application is related to commonly-assigned U.S. patent application Ser. No. 08/508,319 entitled 'CMOS imaging array with active pixels', now abandoned.

FIELD OF THE INVENTION

This invention relates to electronic imaging devices and, more particularly, to an active-pixel image-sensing device which utilizes a reference current for device reset as a method of reducing fixed-pattern noise.

BACKGROUND OF THE INVENTION

Image sensing devices which operate by performing the steps of sensing incident optical radiation, converting the radiation into charge carriers, and storing the charge carriers in photosensitive material are well known in the art.

Most conventional image sensing devices are based on charge-coupled device (CCD) technology. Fabricating a CCD-based imager requires a number of specialized manufacturing operations Moreover, a CCD-based imager utilizes nonstandard voltages, which necessitates a complex power supply and associated distribution circuitry. These requirements make more difficult the task of integrating circuits employing CCDs into an electronic system and increase the complexity of the fabrication process.

Certain design and fabrication difficulties associated with CCD-based image sensing devices can be overcome with an imager comprising pixels with MOSFETs and fabricated using a CMOS process. However, voltage threshold variation among MOSFET devices makes it difficult to achieve uniform and precise resetting of pixels, and produces fixed-pattern noise in the output signal. What is needed is a MOSFET-based image sensing device in which fixed-pattern noise attributable to pixel-to-pixel voltage threshold variation is effectively eliminated. Accordingly, it is an object of the present invention to provide an imaging device which can be fabricated using a CMOS process and which yields a signal with low levels of fixed-pattern noise.

It is a further object of the invention to provide such an imaging device which incorporates a resetting operation that is minimally affected by pixel-to-pixel variation in operating parameters.

SUMMARY OF THE INVENTION

In accordance with the present invention, the foregoing objectives are achieved by an image sensing device comprising one or more pixels with MOSFET components in which a reference current is utilized to reset the pixels and to generate an output current signal. The pixel comprises a photosensitive element for generating charge carriers, an accumulation element for accumulating the charge carriers, a reset switching element for providing the reference current to the accumulation element for draining charge carriers, and an output switching element for providing the reference current to the accumulation element so as to produce a current signal output. The image sensing device may further comprise a reference current mirror, for providing the reference current by means of an external source current, and an output current mirror, for providing a buffer between the pixel and the circuitry external to the image sensing device.

BRIEF DESCRIPTION OF THE DRAWINGS

The novel features that are considered characteristic of the present invention are set forth with particularity herein. The organization and method of operation of the invention, together with other object and advantages thereof, will be best understood from the following description of the illustrated embodiments when read in conjunction with the accompanying drawings wherein.

DETAILED DESCRIPTION OF THE INVENTION

Figure 1:
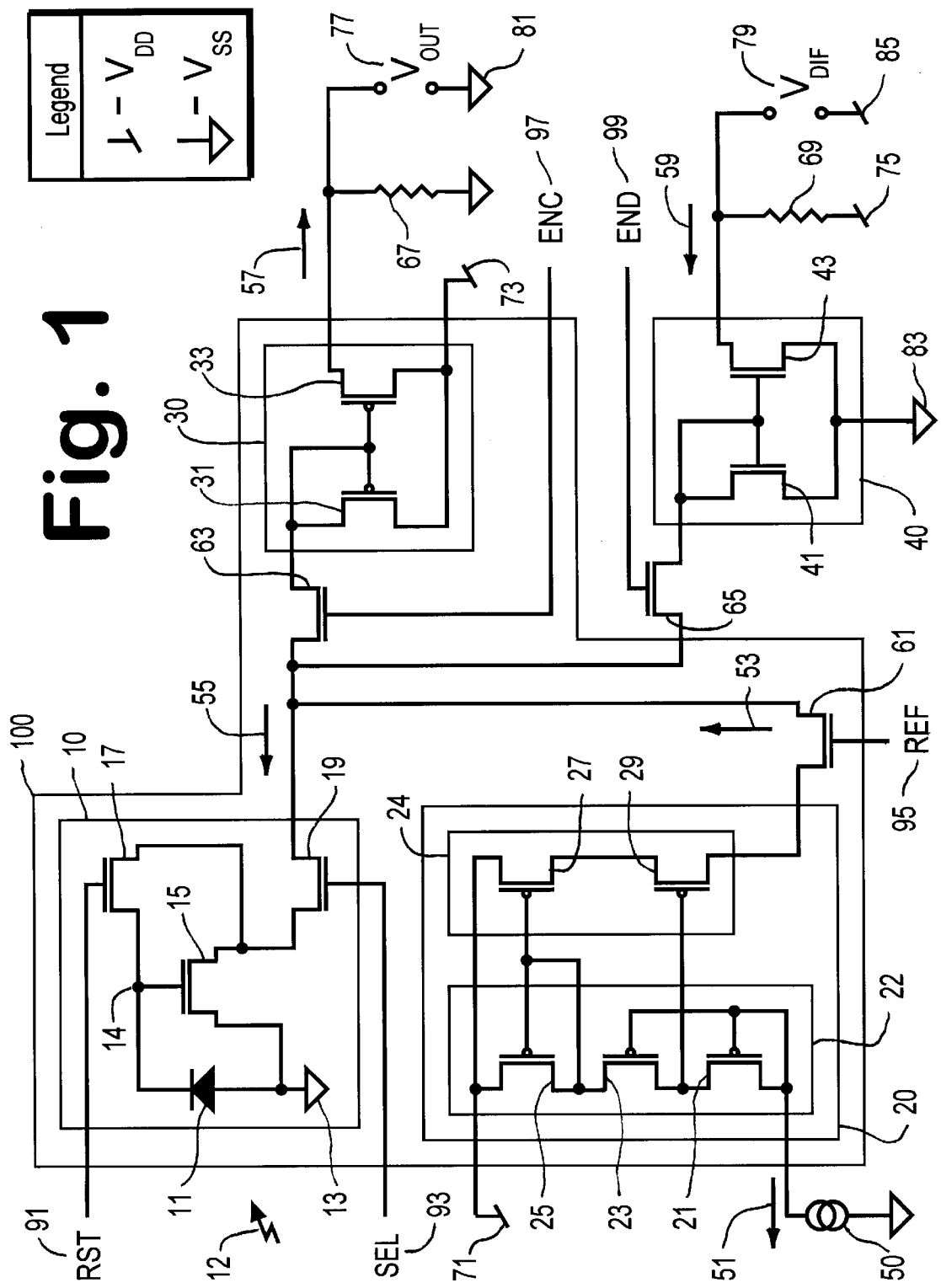
FIG. 1 is a simplified schematic of an image sensing device according to the present invention comprising a pixel having a current reset feature, a reference current mirror, and an output current mirror.

Referring now to FIG. 1, there is shown a simplified electrical schematic of an image sensing device 100, according to the present invention, comprising a pixel 10, a reference current mirror 20, and a direct output current mirror 30. During the operation of image sensing device 100, a current source 50 is used to reset pixel 10 and provide a reference bias. Image sensing is accomplished by acquiring incident optical radiation 12 and thereby producing a change in the electronic characteristics of pixel 10. The resulting change in pixel characteristics is detected and, in a direct mode of operation, is read out as a corresponding output current signal 57 provided at direct output current mirror 30. In a difference mode of operation, preferred for certain alternative embodiments described in greater detail below, a difference current signal 59 is provided at a difference output current mirror 40.

Single-Pixel Image Sensing Device

Pixel 10 comprises a photosensitive device, such as a photodiode 11, which generates charge carrier pairs in relation to the amount of optical radiation 12 acquired. As charge carrier pairs are generated, charge carriers of one polarity flow to a pixel ground 13, and charge carriers of the opposite polarity accumulate at a node 14 which includes the gate terminal of an n-channel MOSFET accumulator 15. In a preferred embodiment, a reset MOSFET switch 17 is provided to enable charge accumulated at node 14 to drain to pixel ground 13.

Reference current mirror 20 comprises an input reference mirror section 22 and an output reference mirror section 24. A source current 51 is provided to both the drain and the gate terminals of a first input p-channel MOSFET 21 and to the gate terminal of a second input p-channel MOSFET 23. The source terminal of first input p-channel MOSFET 21 is connected to the drain terminal of second input p-channel MOSFET 23. The source terminal of second input p-channel MOSFET 23 is connected to both the drain and the gate terminals of a third input p-channel MOSFET 25 and to the gate terminal of a first output p-channel MOSFET 27. The drain terminal of first output p-channel MOSFET 27 is connected to the source terminal of a second output p-channel MOSFET 29, and the gate terminal of second output p-channel MOSFET 29 is connected both to the source terminal of first input p-channel MOSFET 21 and to the drain terminal of second input p-channel MOSFET 23.

Input reference mirror section 22 is biased to a reference bias voltage source 71 ($V_{DD}$) via the source terminal of third input p-channel MOSFET 25 and output reference mirror section 24 is biased to reference bias voltage source 71 via the source terminal of first output p-channel MOSFET 27. Source current 51 is mirrored as a reference current 53 at the drain terminal of second output p-channel MOSFET 29 when a reference signal MOSFET switch 61 is closed.

Direct output current mirror 30 comprises a first output signal p-channel MOSFET 31 and a second output signal p-channel MOSFET 33. Incoming current is provided to both the drain and the gate terminals of first output signal p-channel MOSFET 31 and also to the gate terminal of second output signal p-channel MOSFET 33 when an output signal MOSFET switch 63 is closed. Direct output current mirror 30 is biased by means of an output signal bias voltage 73 ($V_{DD}$) which is applied to both the source terminal of first output signal p-channel MOSFET 31 and the source terminal of second output signal p-channel MOSFET 33. An output signal load 67 receives output current signal 57 from image sensing device 100 so as to provide an output voltage signal 77 ($V_{OUT}$) relative to a ground rail voltage 81 ($V_{SS}$) as shown. In a preferred embodiment, $V_{DD}$ is approximately 5.0 volt and $V_{SS}$ is approximately 0.0 volt. Direct output current mirror 30 acts as a current-to-current buffer between pixel 10 and external circuitry and, accordingly, serves to minimize the effects of external loads on the operation of image sensing device 100. Alternatively, the current-to-current buffer can be provided in the external circuitry rather than in image sensing device 100.

Difference output current mirror 40 comprises a first difference signal n-channel MOSFET 41 and a second difference signal n-channel MOSFET 43. Current is provided to both the drain and the gate terminals of first difference signal n-channel MOSFET 41 and also to the gate terminal of second difference signal n-channel MOSFET 43 when a difference signal MOSFET switch 65 is closed. The source terminals of both first difference signal n-channel MOSFET 41 and second difference signal n-channel MOSFET 43 are connected to a ground rail voltage 83 ($V_{SS}$). A difference signal load 69 is biased by means of a difference signal bias voltage 75 ($V_{SS}$) and is attached to the drain terminal of second difference signal p-channel MOSFET 43. Difference signal load 69 serves to provide a difference voltage signal 79 ($V_{DIF}$) relative to a ground rail voltage 85 ($V_{DD}$) as shown.

Direct Mode of Operation

In the direct mode of operation, pixel 10 is initially placed into a reset phase by first opening output signal MOSFET switch 63. Difference signal MOSFET switch 65 remains open because difference output current mirror 40 is not required in the direct mode of operation. A pixel reset signal 91 (RST) is applied to close reset MOSFET switch 17, a pixel select signal 93 (SEL) is applied to close a select MOSFET switch 19, and a reference signal 95 (REF) is applied to close reference signal MOSFET switch 61. These actions serve to mirror source current 51 as reference current 53, and into pixel 10 as pixel current 55. Pixel current 55 flows to pixel ground 13 causing charge carriers to redistribute between pixel ground 13 and node 14. The reset phase is maintained until after charge carrier redistribution has been completed so as to insure that pixel current 55, which is sunk by pixel 10, matches reference current 53, which is sourced by source current 51. Reset MOSFET switch 17 is then opened to isolate the gate terminal of n-channel MOSFET accumulator 15 and to hold the gate bias at a reference voltage level.

Following the opening of reset MOSFET switch 17, select MOSFET switch 19 and reference signal MOSFET switch 61 are opened to place image sensing device 100 into an exposure phase. In the exposure phase, an image is sensed by exposing pixel 10 to incident radiation 12. The effect of incident radiation 12 on pixel 10 is to cause charge carriers of one polarity to flow to pixel ground 13 and charge carriers of the opposite polarity to accumulate at node 14. The acquisition of incident radiation 12 thus causes the voltage across n-channel MOSFET accumulator 15 to change to a value different from the reference voltage level of the reset phase.

Following the exposure phase, image sensing device 100 is placed into a direct readout phase. A current output enable signal 97 (ENC) is applied to close output signal MOSFET switch 63 and pixel select signal 93 is applied to close select MOSFET switch 19. This action causes pixel current 55 to be sunk by pixel 10.

Pixel current 55 is then mirrored by direct output current mirror 30 to produce output current signal 57. It can be readily appreciated by one skilled in the relevant art that using the above-described method to reset pixel 10 serves to eliminate from output signal current 57 such signal error as would otherwise be incurred from threshold voltage variation in n-channel MOSFET accumulator 15.

If pixel 10 has received no radiation during the exposure phase, the voltage a cross n-channel MOSFET accumulator 15 remains at the reference voltage level of the reset phase, and output current signal 57 remains equal to reference current 53. If pixel 10 has received maximum radiation exposure, pixel current 55 and output current signal 57 decrease to a zero current level. For intermediate levels of radiation exposure, output current signal 57 varies in relation to the amount of incident optical radiation 12 acquired and attains a current level no greater than that of reference current 53. At the completion of the readout phase, select MOSFET switch 19 is opened.

Difference Mode of Operation

In the difference mode of operation, pixel 10 is placed into the reset phase by first opening difference signal MOSFET switch 65. Output signal MOSFET switch 63 remains open because direct output current mirror 30 is not required in the difference mode of operation. Pixel reset signal 91 is applied to close reset MOSFET switch 17, pixel select signal 93 is applied to close select MOSFET switch 19, and reference signal 95 is applied to close reference signal MOSFET switch 61, as in the direct mode of operation. The reset phase is maintained until after charge carrier redistribution has been completed so as to insure that pixel current 55 matches reference current 53. Reset MOSFET switch 17 is then opened.

Select MOSFET switch 19 and reference signal MOSFET switch 61 are opened to place image sensing device 100 into the exposure phase. Following the exposure phase, image sensing device 100 is placed into the difference readout phase. A difference output enable signal 99 END) is applied to close difference signal MOSFET switch 65, pixel select signal 93 is applied to close select MOSFET switch 19, and reference signal 95 is applied to close reference signal MOSFET switch 61. This action causes pixel current 55 to be subtracted from reference current 53. The difference in current between reference current 53 and pixel current 55 is mirrored by output current mirror 40 to produce difference current signal 59.

If pixel 10 receives no radiation during the exposure phase, pixel current 55 is sourced by reference current 53, no current is sunk by difference output current mirror 40, and difference current signal 59 decreases to a zero current level. If pixel 10 has received maximum radiation exposure, pixel current 55 decreases to zero, reference current 53 is sunk by the input to difference output current mirror 40, and difference current signal 59 is essentially equivalent to reference current 53. For intermediate levels of radiation exposure, pixel current 55 remains less than reference current 53, current is sunk by the input of difference output current mirror 40, and difference current signal 59 varies in relation to the amount of incident optical radiation 12 acquired and attains a current level no greater than that of reference current 53. At the completion of the readout phase, select MOSFET switch 19 is opened.

Alternative Single-Pixel Embodiment

Figure 2:
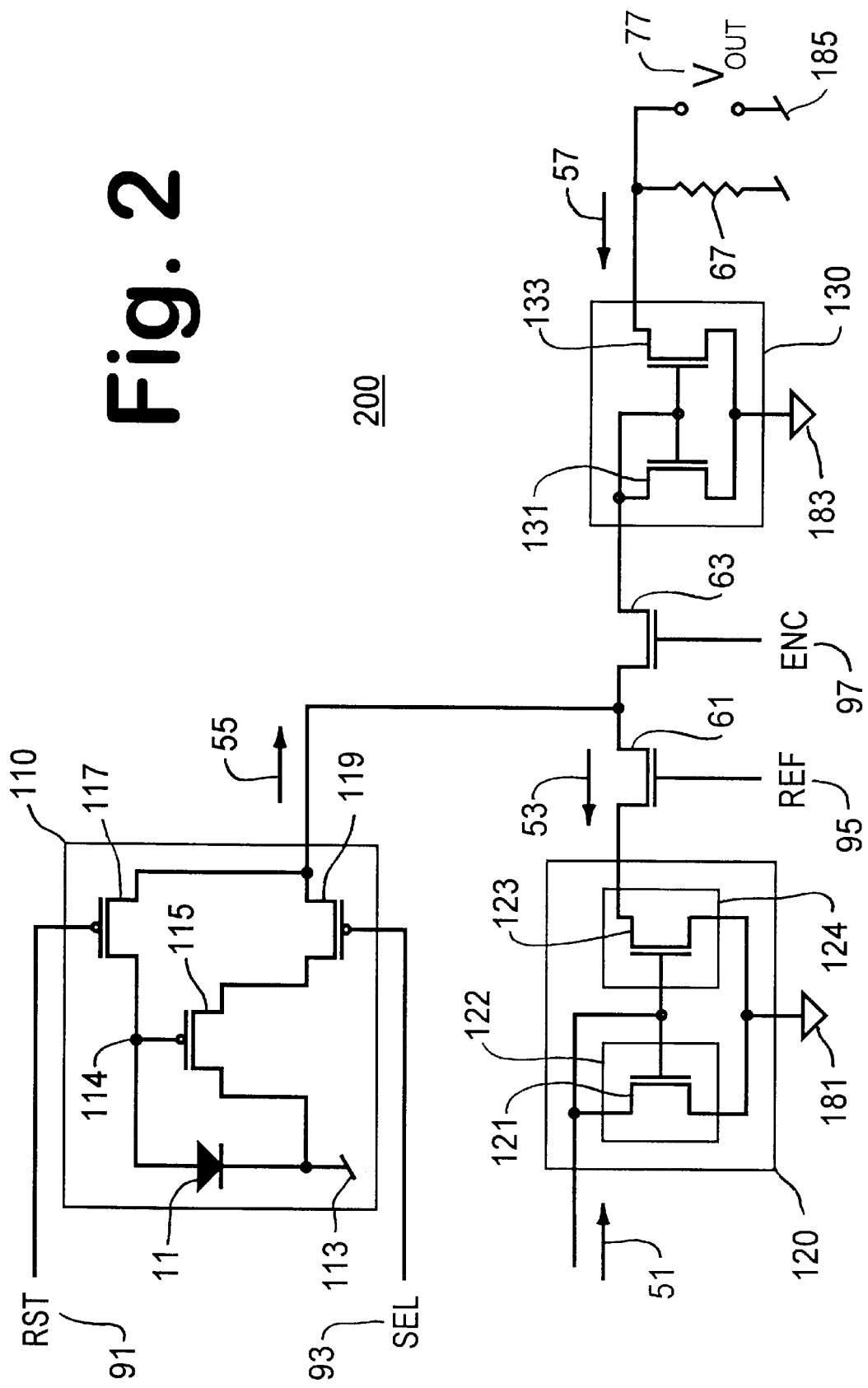
FIG. 2 is an alternate configuration of the image sensing device of FIG. 1.

Referring now to FIG. 2, there is shown a simplified electrical schematic of an alternative configuration of the image sensing device according to the present invention. Image sensing device 200 comprises a pixel 110, a reference current mirror 120, and a direct output current mirror 130. Image sensing device 200 is distinguished from image sensing device 100, above, in the follow respects: i) the orientation of photosensitive device has been reversed within the pixel circuit, ii) the polarity-types of non-switching MOSFET devices have been changed, iii) voltage sources $V_{DD}$ and $V_{SS}$ have been interchanged, and iv) the configurations of reference current mirror 120 and direct output current mirror 130 are similar. Accordingly, current flow in image sensing device 200 is in a direction opposite to the corresponding current flow in image sensing device 100. Those components otherwise common to both image sensing device 100 and image sensing device 200 are referenced by the same numbers.

Pixel 110 comprises photodiode 11, oriented as shown with respect to a voltage source 113 ($V_{DD}$), and a p-channel MOSFET accumulator 115. Pixel 110 also comprises a p-channel reset MOSFET switch 117 and a p-channel select MOSFET switch 119 connected as shown to enable charge accumulated at node 114 to drain to voltage source 113. It can be appreciated by one skilled in the relevant art that p-channel and n-channel MOSFET switch devices can be used interchangeably in image sensing device 100 and in image sensing device 200. However, fabrication of a pixel in which the switch devices are of the same polarity type as the MOSFET accumulator is preferred because such a pixel configuration requires a smaller substrate area than does a pixel configuration in which one or both of the switch devices are of a polarity-type opposite that of the MOSFET accumulator.

Reference current mirror 120 comprises an input reference mirror section 122 and an output reference mirror section 124. Source current 51 is provided to input mirror section 122 via both the drain and the gate terminals of an input section n-channel MOSFET 121, and to output mirror section 124 via the gate terminal of an output section n-channel MOSFET 123. A voltage source 181 ($V_{SS}$) is applied to both the source terminal of input section n-channel MOSFET 121 and to the source terminal of output section n-channel MOSFET 123. Reference current mirror 120 provides reference current 53 when reference signal MOSFET 61 is closed.

When output signal MOSFET switch 63 is closed, current is provided to direct output current mirror 130 via both the drain and the gate terminals of a first output n-channel MOSFET 131 and to the gate terminal of a second output n-channel MOSFET 133. The source terminal of first output n-channel MOSFET 131 is connected to the drain terminal of second output n-channel MOSFET 133. Direct output current mirror 130 is biased to a reference bias voltage source 183 ($V_{SS}$) via both the source terminal of first output n-channel MOSFET 131 and the source terminal of second output n-channel MOSFET 133. Pixel current 55 is mirrored as output current 57 at the drain terminal of second output n-channel MOSFET 133 when output signal MOSFET switch 63 is closed. Output signal load 67 receives output current signal 57 and provides output voltage signal 77 relative to a rail voltage 185 ($V_{DD}$) as shown. The operation of image sensing device 200 is similar to the direct mode of operation of image sensing device 100, as described above.

Multi-Pixel Image Sensing Array

Figure 3:
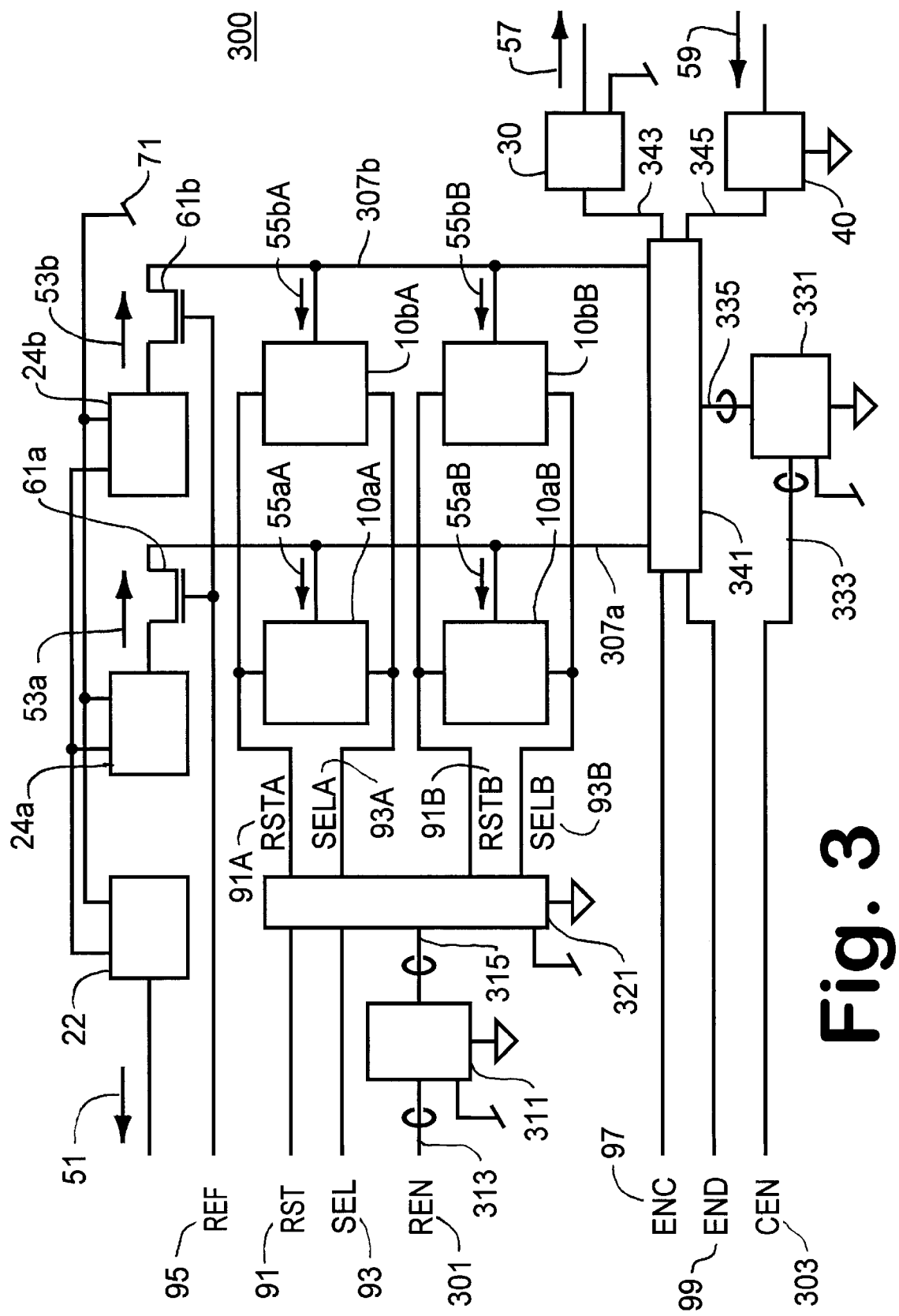
FIG. 3 is a simplified schematic of an image sensing array according to the present invention comprising an array of pixels, reference current mirrors, an output current mirror, a row multiplexer, and a column multiplexer.

Referring now to FIG. 3, there is shown a simplified electrical schematic of an image sensing array 300 comprising a plurality of pixels 10 arranged in rows and columns, direct output current mirror 30, and difference output current mirror 40. Image sensing array 300 comprises certain elements in common with image sensing device 100. Accordingly, these elements have retained the same reference numbers in the description following except that for some elements (e.g., switch 61a and pixel 10aA), one or two letters have been suffixed to the reference number for clarity in distinguishing among otherwise identical elements. Although the description makes reference to an array of only four pixels for succinctness, the inventive concept is equally applicable to any larger array. Extension of the inventive concept from the disclosed four-pixel configuration to the larger array is straightforward, as can be appreciated by one skilled in the art.

Image sensing array 300 comprises pixels 10aA, 10bA, 10aB, and 10bB, arranged in two rows (row "A" and row "B") and two columns (column "a" and column "b"). In this configuration, all pixels in the same column are connected to a common signal line by which reference current is supplied and output signals are transmitted. Pixels 10aA and 10aB are connected by a column signal line 307a to an output reference mirror section 24a, through a reference signal MOSFET switch 61a, and to a column multiplexer 341. Pixels 10bA and 10bB are connected by a column signal line 307b to an output reference mirror section 24b, through a reference signal MOSFET switch 61b, and to column multiplexer 341. If speed of operation is not a factor, output reference mirror section 24a alone can be used to provide reference current to both pixel columns.

Source current 51 is provided to input reference mirror section 22 and is mirrored as a reference current 53a by output reference mirror section 24a, and as a reference current 53b by output reference mirror section 24b. Reference bias voltage source 71 provides bias voltage to input reference mirror section 22, to output reference mirror section 24a, and to output reference mirror section 24b as shown. Reference current 53a appears on column signal line 307a when reference signal MOSFET switch 61a is closed, and reference current 53b appears on column signal line 307b when reference signal MOSFET switch 61b is closed. During operation of image sensing array 300, output current signal 57 and difference current signal 59 are provided from direct output current mirror 30 and difference output current mirror 40, respectively, as described in greater detail below.

Pixels are selected for placement into the reset, exposure, and readout phases described above by means of a binary row enable signal 301 (REN) provided on a row enable signal bundle 313, and a binary column enable signal 303 (CEN) provided on a column enable signal bundle 333. Row enable signal 301 is transmitted to a row decoder 311 which is connected by a row enable line bundle 315 to a row multiplexer 321. Similarly, column enable signal 303 is transmitted to a column decoder 331 which is connected by a column enable line bundle 335 to column multiplexer 341. The use of decoders in such applications is well known in the relevant art. For an input of N signal lines, a decoder is capable of addressing up to $2^N$ rows of pixels. In a preferred embodiment, row enable signal bundle 313 comprises nine signal lines and column enable signal bundle 333 comprises ten signal lines. In an alternative embodiment, either or both row decoder 311 and column decoder 331 can comprise a scanner rather than a decoder.

Figure 4:
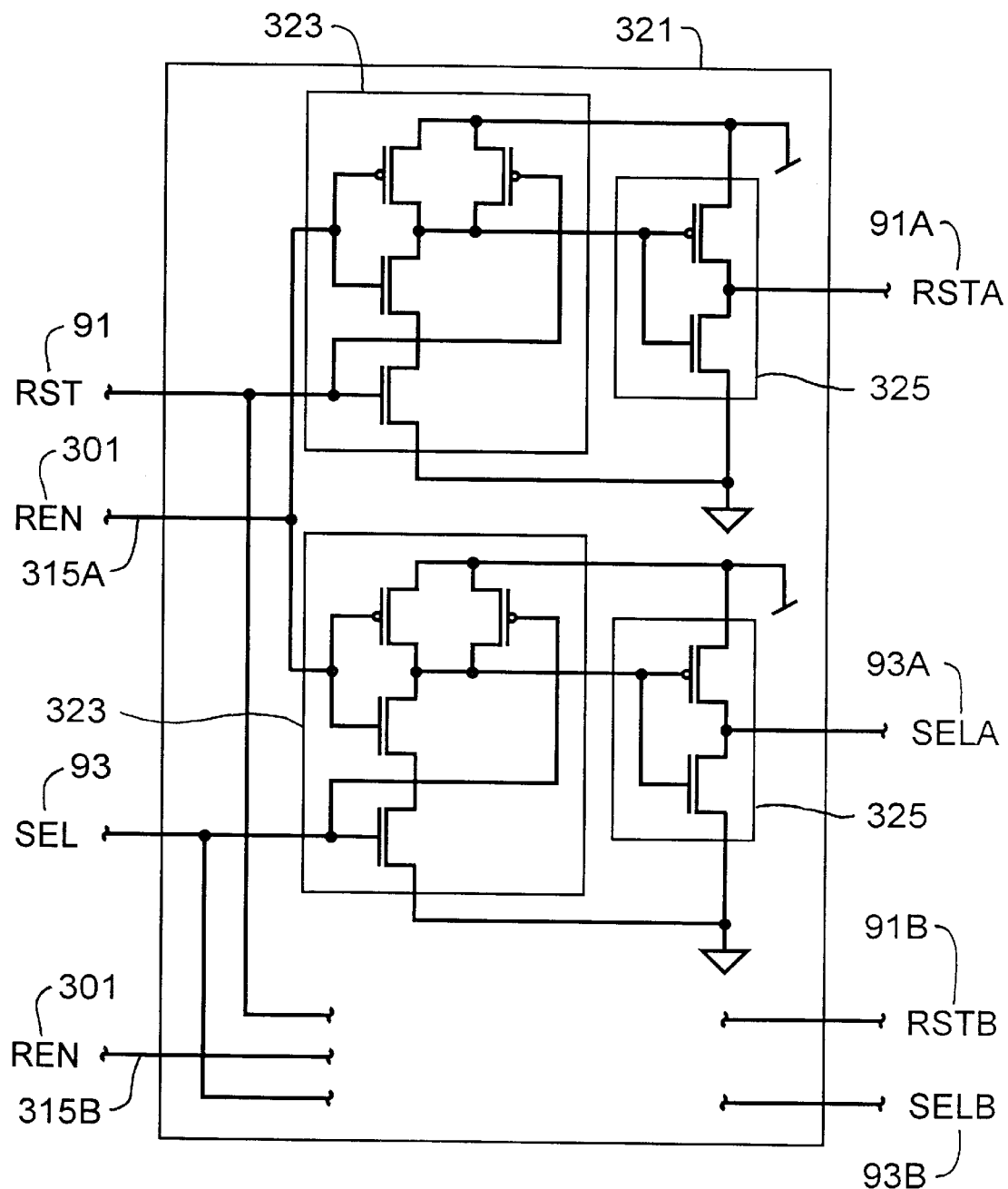
FIG. 4 is a simplified schematic of the row multiplexer of FIG. 3.

As best shown in FIG. 4, row multiplexer 321 comprises a NAND gate 323 and an inverter 325 for each signal transmitted to each row of pixels 10 addressed in image sensing array 300. In the example provided, row enable line bundle 315 comprises a row A enable line 315A and a row B enable line 315B. When pixel reset signal 91 is provided to row multiplexer 321 and row enable signal 301 is provided on row A enable line 315A, a row A pixel reset signal 91 A (RSTA) is sent to pixel 10aA and pixel 10bA. When pixel select signal 93 is provided to row multiplexer 321 and row enable signal 301 is provided on row A enable line 315A, a row A pixel select signal 93A (SELA) is sent to pixel 10aA and pixel 10bA. Row B pixel select signal 91B (RSTB) and row B pixel reset signal 93B (SELB), similarly provided with row enable signal 301 on row B enable line 315B, are sent to pixel 10aB and pixel 10bB.

Figure 5:
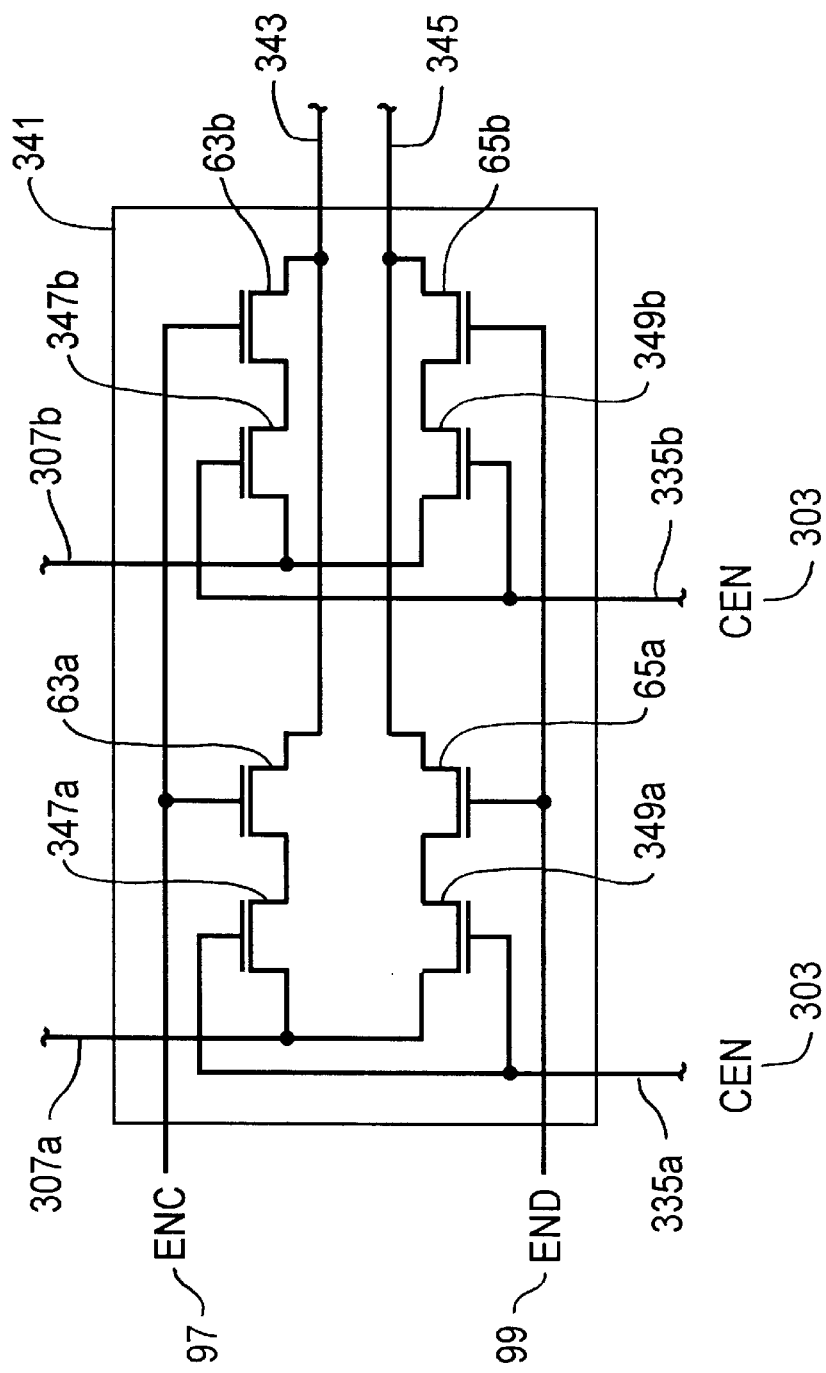
FIG. 5 is a simplified schematic of the column multiplexer of FIG. 3.

Column selection in image sensing array 300 is accomplished by means of switching operations performed within column multiplexer 341. As best shown in FIG. 5, column enable line bundle 335 comprises a column-a enable line 335a and a column-b enable line 335b. When column enable signal 303 is provided to column multiplexer 341 on column-a enable line 335a, a column-a output signal MOSFET switch 347a and a column-a difference output signal MOSFET switch 349a are closed. Similarly, when column enable signal 303 is provided to column-b enable line 335b, a column-b output signal MOSFET switch 347b and a column-b difference output signal MOSFET switch 349b are closed. Output signal MOSFET switches 63a and 63b are closed by current output enable signal 97, and difference signal MOSFET switches 65a and 65b are closed by difference output enable signal 99. As is well known in the relevant art, an appropriate application of these switching operations will select the current signal present on either column signal line 307a or 307b for transmittal to direct output current mirror 30 via a column multiplexer output current line 343 or to difference output current mirror 40 via a column multiplexer difference current line 345.

Operation of image sensing array 300 is similar to the direct and difference modes of operation described above for image sensing device 100. The array of pixels 10 is placed into the reset phase, one row at a time, by first opening output signal MOSFET switches 63 and difference signal MOSFET switches 65 in column multiplexer 341. Pixel reset signal 91 and pixel select signal 93 are then provided to row multiplexer 321 via row A enable line 315A. Row multiplexer 321 transmits pixel reset signal 91A and pixel select signal 93A. This action closes reset MOSFET switches 17 (not shown) and select MOSFET switches 19 (not shown) in pixel 10aA and in pixel 10bA. Reference signal 95 is applied to close reference signal MOSFET switches 61a and 61b. Reference current 53a is provided to pixel 10aA as pixel current 55aA, and reference current 53b is provided to pixel 10bA as pixel current 55bA. The reset phase is maintained until after charge carrier redistribution has been completed within each pixel in row A. The pixels in row B are then placed into the reset phase by transmitting pixel reset signal 91B and pixel select signal 93B by means of row multiplexer 321 and following a similar set of operations.

Reset MOSFET switches 17, select MOSFET switches 19, and reference signal MOSFET switch 61a and 61b are opened to place image sensing array 300 into the exposure phase and the desired image is acquired. To produce output current signal 57 from pixel 10aA, pixel select signal 93A is applied to close select MOSFET switch 19 in pixel 10aA and current output enable signal 97 is applied to close output signal MOSFET switch 63a. To produce output current signal 57 from pixel 10aB, current output enable signal 97 is applied to close output signal MOSFET switch 63b, and pixel select signal 93B is applied to close select MOSFET switch 19 in pixel 10aB.

To produce difference current signal 59 from pixel 10aA, output signal MOSFET switches 63 remain open and difference output enable signal 99 is applied to close difference signal MOSFET switch 65a. Pixel select signal 93A is applied to close select MOSFET switch 19 in pixel 10aA and reference signal 95 is applied to close reference signal MOSFET switches 61a and 61b. This action causes pixel current 55aA to be subtracted from reference current 53a. The differences in current are mirrored by output current mirror 40 to produce difference current signal 59. Similar sequences of operations are executed to produce difference current signal 59 from pixel 10bA, pixel 10aB, or pixel 10bB.

The preferred mode of operation depends upon the particular configuration of image sensing array 300. Referring to FIG. 3, it can be appreciated by one skilled in the relative art that current output differences between output reference mirror sections 24a and 24b will produce fixed pattern noise in the output signal. These differences are minimized or eliminated when the difference mode of operation is used, as described above. Accordingly, for a two-dimensional array of pixels, image sensing array 300 preferably operates in the difference mode and provides difference current signal 59 from difference output current mirror 40. For an image sensing array comprising a single column of pixels and a single corresponding output reference mirror section, the preferred mode of operation is the direct mode in which output current signal 57 is provided from direct output current mirror 30.

Alternatively, each row of pixels can be reset and then exposed before another row of pixels is reset. In another method of operation, one row of pixels is maintained in an extended exposure mode while one or more other rows of pixels are reset.

The present invention is advantageously adapted to respond to incident radiation and provide a current signal output exhibiting less fixed-pattern noise than is presently available in conventional MOSFET imaging devices. While there have been described herein preferred embodiments of the present invention, it will be readily apparent to those skilled in the relevant art that various changes and modifications may be made therein without departing from the scope of the invention, and it is intended in the wording of the appended claims to include such changes and modifications as would be encompassed by the true spirit and teachings of the invention. As will be appreciated by those skilled in the relevant art, the embodiments described are not meant to be interpreted in a limiting sense.

What is claimed is:

1. An image sensing device for receiving incident optical radiation and converting an external reference current into a current signal output related to the amount of radiation received, said device comprising:

a pixel comprising:

a photosensitive element for receiving the optical radiation and generating charge carriers of one polarity in proportion to the quantity of radiation acquired;

charge accumulation means, connected to said photosensitive element, for accumulating the charge carriers generated by said photosensitive element;

reset switching means comprising two terminals, one reset switching means terminal connected to said photosensitive element and the other reset switching terminal connected to said charge accumulation means; and select switching means connected to said charge accumulation means;

a reference current mirror connected to the external reference current; and reference switching means, disposed between said select switching means and said reference current mirror, for providing the reference current to said pixel such that the current signal output is produced.

2. The image sensing device of claim 1 wherein said reference current mirror comprises an input reference mirror section, for receiving the reference current, and an output reference mirror section.

3. The image sensing device of claim 2 wherein said input reference mirror section comprises at least one MOSFET.

4. The image sensing device of claim 2 wherein said output reference mirror section comprises at least one MOSFET.

5. The image sensing device of claim 1 further comprising at least one output current mirror and at least one signal switching means, said signal switching means disposed between said select switching means and said output current mirror.

6. The image sensing device of claim 5 wherein said output current mirror comprises at least two MOSFET devices.

7. A method of sensing an image, said method comprising the steps of:

closing an electrical path between a first terminal and a second terminal of a charge accumulator;

providing a reference current to said second terminal while said electrical path is maintained, so as to reset said charge accumulator:

opening said electrical path between said charge accumulator terminals;

acquiring optical radiation corresponding to the image;

converting said acquired optical radiation into charge carriers of one polarity;

accumulating said charge carriers onto said first terminal, so as to produce a voltage level in said charge accumulator in proportion to the amount of optical radiation acquired; and providing said reference current to said second terminal so as to sense said charge accumulator voltage level and produce an output current signal, said output current signal being related to the amount of optical radiation acquired.

8. The method of claim 7 wherein said charge accumulator comprises a MOSFET.

9. An image sensing array for receiving incident optical radiation representative of an image and converting an external reference current into a plurality of current signal outputs related to the image, said image sensing array comprising:

a plurality of pixels, each said pixel comprising:

a photosensitive element for receiving a portion of the optical radiation and generating charge carriers of one polarity in relation to the amount of radiation acquired;

charge accumulation means, connected to said photosensitive element, for accumulating the charge carriers generated by said photosensitive element;

reset switching means comprising two terminals, one reset switching means terminal connected to said photosensitive element and the other reset switching terminal connected to said charge accumulation means; and select switching means, connected to said charge accumulation means, for providing the reference current to said charge accumulation means such that a current signal is produced;

an input reference mirror section connected to the external reference current;

a plurality of output reference mirror sections connected to said input reference mirror section; and a plurality of reference signal switching means, each said reference signal switching means disposed between a respective portion of said plurality of pixels and a respective one of said output reference mirror sections, for providing the reference current to said respective portion of pixels.

10. The image sensing array of claim 9 further comprising an output current mirror, for receiving each said current signal and providing the plurality of current signal outputs.

11. The image sensing array of claim 9 further comprising at least one multiplexer, for switching current to or from a selected portion of pixels.

12. The image sensing array of claim 11 wherein said multiplexer comprises a plurality of MOSFET devices.

13. The image sensing array of claim 11 further comprising at least one decoder.

* * * * *